United States Patent
Levanen (10) Patent No.: US 11,855,811 B1
(45) Date of Patent: Dec. 26, 2023

(54) INTERFERENCE REJECTION COMBINING WITH REDUCED COMPLEXITY

(71) Applicant: NOKIA SOLUTIONS AND NETWORKS OY, Espoo (FI)

(72) Inventor: Toni Aleksi Levanen, Tampere (FI)

(73) Assignee: NOKIA SOLUTIONS AND NETWORKS OY, Espoo (FI)

(*) Notice: Subject to any disclaimer, the term of this patent is extended or adjusted under 35 U.S.C. 154(b) by 0 days.

(21) Appl. No.: 18/200,844

(22) Filed: May 23, 2023

(30) Foreign Application Priority Data

May 27, 2022 (FI) .................................... 20225464

(51) Int. Cl.
*H04L 25/03* (2006.01)
*H04L 25/02* (2006.01)
*H04B 7/08* (2006.01)

(52) U.S. Cl.
CPC ......... *H04L 25/03006* (2013.01); *H04B 7/08* (2013.01); *H04L 25/021* (2013.01); *H04L 25/0212* (2013.01)

(58) Field of Classification Search
CPC ..... H04B 7/08; H04L 25/021; H04L 25/0212; H04L 25/03006
See application file for complete search history.

(56) References Cited

U.S. PATENT DOCUMENTS

| | | | | |
|---|---|---|---|---|
| 7,623,602 B2 * | 11/2009 | Guess | .................. | H04B 1/7107 375/347 |
| 8,428,106 B2 * | 4/2013 | Cairns | .................... | H04B 1/712 375/150 |
| 8,665,693 B1 * | 3/2014 | Cheng | ..................... | H04L 1/005 370/204 |
| 8,665,910 B2 * | 3/2014 | Haustein | ............... | H04L 5/0051 370/324 |

(Continued)

FOREIGN PATENT DOCUMENTS

| CN | 110753012 A | 2/2020 |
|---|---|---|
| CN | 114142905 A | 3/2022 |

OTHER PUBLICATIONS

Finnish Office Action and Search Report dated Nov. 2, 2022 corresponding to Finnish Patent Application No. 20225464.
(Continued)

*Primary Examiner* — James M Perez
(74) *Attorney, Agent, or Firm* — SQUIRE PATTON BOGGS (US) LLP (57) ABSTRACT

A method and apparatus comprises acquiring set of input streams associated with a spatial layer configured for a terminal device, and estimating a channel vector h representing a radio channel response associated with the spatial layer. An interference covariance matrix R representing power of interference is computed from at least one other spatial layer in the set of input streams and correlation of the interference within the set of input streams of the spatial (Continued)

layer. A per-layer interference rejection is performed, combining equalization on the set of input streams, comprising: a) estimating x=R−1h as a combination of a set of linear equations, wherein the number of linear equations is defined by an input parameter to be equal to or smaller than dimensions of the interference covariance matrix; and b) computing an estimate of a transmitted symbol on the basis of the channel vector and the estimated x.

14 Claims, 4 Drawing Sheets

(56) References Cited

U.S. PATENT DOCUMENTS

| | | | | |
|---|---|---|---|---|
| 8,761,317 | B2* | 6/2014 | Jonsson | H03M 13/6337 |
| | | | | 370/335 |
| 8,862,168 | B2* | 10/2014 | Li | H04L 25/03006 |
| | | | | 455/501 |
| 9,198,079 | B2* | 11/2015 | Jonsson | H04L 25/0236 |
| 9,369,309 | B2* | 6/2016 | Seyama | H04J 11/005 |
| 9,628,301 | B2* | 4/2017 | Guo | H04L 25/03114 |
| 9,641,294 | B2* | 5/2017 | Nabar | H04B 7/0874 |
| 9,806,912 | B2* | 10/2017 | Barbu | H04L 25/067 |
| 9,954,641 | B2* | 4/2018 | Sandberg | H04L 25/021 |
| 10,594,406 | B2* | 3/2020 | Zhu | H04B 10/6164 |
| 10,778,476 | B2* | 9/2020 | Renfors | H04L 27/26265 |
| 10,998,932 | B2* | 5/2021 | Tsiaflakis | H04B 3/32 |
| 11,418,239 | B2* | 8/2022 | Vijayan | H04L 25/03993 |
| 11,558,881 | B2* | 1/2023 | Simonen | H04W 72/542 |
| 11,664,867 | B2* | 5/2023 | Levanen | H04B 7/0456 |
| | | | | 375/267 |
| 2004/0141565 | A1* | 7/2004 | Kwak | H04L 25/03305 |
| | | | | 375/267 |
| 2006/0268923 | A1* | 11/2006 | Wu | H04L 25/0204 |
| | | | | 370/441 |
| 2006/0268972 | A1* | 11/2006 | Wu | H04L 25/0212 |
| | | | | 375/229 |
| 2007/0049232 | A1* | 3/2007 | Wu | H04L 25/0212 |
| | | | | 455/307 |
| 2007/0049233 | A1* | 3/2007 | Wu | H04B 7/0617 |
| | | | | 455/307 |
| 2007/0110137 | A1* | 5/2007 | Guess | H04B 1/7107 |
| | | | | 375/267 |
| 2011/0122789 | A1* | 5/2011 | Haustein | H04L 5/0051 |
| | | | | 455/67.11 |
| 2012/0113897 | A1* | 5/2012 | Thiele | H04B 7/0452 |
| | | | | 370/328 |
| 2013/0157675 | A1* | 6/2013 | Li | H04J 11/0036 |
| | | | | 455/452.1 |
| 2013/0243046 | A1* | 9/2013 | Vetterli | H04L 25/0204 |
| | | | | 375/267 |
| 2013/0294494 | A1* | 11/2013 | Wang | H04J 11/004 |
| | | | | 375/233 |
| 2015/0092583 | A1* | 4/2015 | Balraj | H04B 7/0639 |
| | | | | 370/252 |
| 2015/0156670 | A1* | 6/2015 | Jonsson | H04L 25/0226 |
| | | | | 455/502 |
| 2016/0028516 | A1* | 1/2016 | Nabar | H04L 25/0238 |
| | | | | 370/329 |
| 2016/0204844 | A1* | 7/2016 | Sandberg | H04B 7/0486 |
| | | | | 370/252 |
| 2019/0260459 | A1* | 8/2019 | Jeon | H04B 7/04 |
| 2020/0007361 | A1* | 1/2020 | Renfors | H04L 5/0098 |
| 2020/0228161 | A1* | 7/2020 | Tsiaflakis | H04B 3/32 |
| 2021/0306039 | A1* | 9/2021 | Vijayan | H04B 1/06 |
| 2022/0131580 | A1* | 4/2022 | Kuchi | H04B 7/0456 |
| 2022/0376956 | A1* | 11/2022 | Wesemann | H04L 1/0061 |
| 2022/0377759 | A1* | 11/2022 | Simonen | H04W 72/20 |
| 2022/0393817 | A1* | 12/2022 | Kuchi | H04L 5/0023 |
| 2023/0106724 | A1* | 4/2023 | Levanen | H04B 7/0404 |
| | | | | 375/267 |
| 2023/0120730 | A1* | 4/2023 | Horn | H04W 72/51 |
| | | | | 370/329 |

OTHER PUBLICATIONS

Communication of Acceptance dated Apr. 24, 2023 corresponding to Finnish Patent Application No. 20225464.

C. Xiao et al., "Low-Complexity Soft-Output Detection for Massive MIMO Using SCBiCG and Lanczos Methods," In: China Communications. IEEE, Dec. 2015, vol. 12, pp. 9-17.

Huiyang Qu et al., "Efficient Channel Equalization and Symbol Detection for MIMO OTFS Systems," IEEE Transactions on Wireless Communications, IEEE [online], Feb. 2022, vol. 21, No. 8, pp. 6672-6686.

Wikipedia. Krylov subspace. [online], Mar. 1, 2022. <https://en.wikipedia.org/w/index.php?title=Krylov_subspace&oldid=1074614180>.

Extended European Search Report dated Oct. 16, 2023 corresponding to European Patent Application No. 23174452.5.

Erfan Majeed et al., "Advanced Receiver Design for Interfering Small Cell Deployments in LTE Networks," 2015 IEEE Conference on Standards for Communications and Networking (CSCN), Oct. 28, 2015, pp. 294-299, XP032856182.

Ammar Ali Sahrab et al., "Enhanced IRC-SIC Algorithm with Beamforming for MU-MIMO Systems," 2015 International Symposium on Signals, Circuits and Systems (ISSCS), IEEE, Jul. 9, 2015, pp. 1-4, XP033195451.

* cited by examiner

INTERFERENCE REJECTION COMBINING WITH REDUCED COMPLEXITY

CROSS REFERENCE TO RELATED APPLICATION

This application claims the benefit of Finnish Patent Application No. 20225464, filed May 27, 2022. The entire content of the above-referenced application is hereby incorporated by reference.

FIELD

Various embodiments described herein relate to the field of wireless communications and, particularly, to performing interference rejection combining in a multiple-input-multiple-output (MIMO) receiver.

BACKGROUND

Interference rejection combining (IRC) techniques are widely applied for mitigating co-channel interference. In particular, cellular communication systems employ IRC reception methods. The IRCs may be applied to multi-beam reception techniques such as MIMO communications. A benefit of an IRC receiver is that it does not need detailed information about interfering signals, such as radio channel propagation characteristics. Therefore, IRC receivers are simple compared to other receiver architectures. As known in the art, a characteristic of an IRC receiver is computation of a covariance matrix representing covariance between a desired signal and the interfering signals. Inversion of the covariance matrix is also a characteristic of the IRC receiver, and the inversion operation is computationally complex.

XIAO, C. et al. Low-complexity soft-output detection for massive MIMO using SCBiCG and Lanczos methods. In: China Communications. IEEE [online], December 2015, Vol. 12, pages 9-17 discloses a minimum mean square error (MMSE) detection scheme for uplink massive MIMO systems utilizing the symmetric complex bi-conjugate gradients (SCBiCG) and the Lanczos method.

QU, H. et al. Efficient Channel Equalization and Symbol Detection for MIMO OTFS Systems. In: IEEE Transactions on Wireless Communications. IEEE [online], February 2022, Vol. 21, No. 8, pages 6672-6686 discloses a time-space domain channel equalizer for MIMO over orthogonal time frequency space (OTFS) modulation, relying on the mathematical least squares minimum residual algorithm, to remove the channel distortion on data symbols.

BRIEF DESCRIPTION

Some aspects of the invention are defined by the independent claims.

Some embodiments of the invention are defined in the dependent claims.

The embodiments and features, if any, described in this specification that do not fall under the scope of the independent claims are to be interpreted as examples useful for understanding various embodiments of the invention. Some aspects of the disclosure are defined by the independent claims.

According to an aspect, there is provided an apparatus comprising means for performing: acquiring set of input streams associated with a spatial layer configured for a terminal device; estimating, on the basis of a reference signal, a channel vector h representing a radio channel response associated with the spatial layer; computing an interference covariance matrix R representing power of interference from at least one other spatial layer in the set of input streams and correlation of the interference within the set of input streams of the spatial layer; performing a per-layer interference rejection combining equalization on the set of input streams, comprising:

a) estimating $x=R^{-1}h$ as a combination of a set of linear equations, wherein the number of linear equations is defined by an input parameter to be equal to or smaller than dimensions of the interference covariance matrix; and b) computing an estimate of a transmitted symbol on the basis of the channel vector and the estimated x.

In an embodiment, the input parameter is dependent on at least one of a number of input streams in the set of input streams, a modulation and coding scheme of the spatial layer, and a total number of spatial layers configured for all terminal devices scheduled to the same time-frequency resources as the terminal device.

In an embodiment, the input parameter is dependent on the number of input streams, the modulation and coding scheme of the spatial layer, and the total number of spatial layers, and wherein values of the input parameter are directly proportional with an order of the modulation and coding scheme, directly proportional to the number of spatial layers, and inversely proportional to the number of input streams.

In an embodiment, the set of linear equations defines a Krylov sub-space presentation comprising orthonormal basis vectors defining the Krylov sub-space, wherein the input parameter defines the number of said orthonormal basis vectors.

In an embodiment, the Krylov sub-space presentation further comprises elements of a real-valued tridiagonal matrix, and wherein step b) comprises inversion of the real-valued tridiagonal matrix.

In an embodiment, the means are configured to perform the inversion of the real-value tridiagonal matrix when solving weights for the orthonormal basis vectors by using Thomas algorithm, to combine the weights with the respective orthonormal basis vectors and with an initial estimate, and to compute the estimate of the transmitted symbol on the basis of said combining.

In an embodiment, the means are configured to perform the inversion of the real-value tridiagonal matrix when solving weights for the orthonormal basis vectors by computing an eigenvalue decomposition of the tridiagonal matrix, to compute the weights by inverting eigenvalues of the eigenvalue decomposition, to combine the weights with the respective orthonormal basis vectors and with an initial estimate, and to compute the estimate of the transmitted symbol on the basis of said combining.

In an embodiment, the means are configured to use the initial estimate $x_0=h./diag(R)$ in step b), wherein ./ represents element-wise division operation.

In an embodiment, the means are configured to generate the Krylov sub-space presentation by using Lanczos algorithm.

In an embodiment, the means are configured to interpolate the estimated x or a parameter derived from x to time-frequency resources not carrying the reference signal.

In an embodiment, the means are configured to average in a determined number of channel estimates, wherein the determined number is a function of a modulation and coding scheme associated with the spatial layer.

In an embodiment, the determined number is smaller for a first modulation scheme than for a second modulation scheme, wherein the first modulation scheme maps a greater number of bits per symbol than the second modulation scheme.

In an embodiment, the means comprise at least one processor and at least one memory including computer program code, the at least one memory and computer program code configured to, with the at least one processor, cause the performance of the apparatus.

According to an aspect, there is provided a method comprising: acquiring set of input streams associated with a spatial layer configured for a terminal device; estimating, on the basis of a reference signal, a channel vector h representing a radio channel response associated with the spatial layer; computing an interference covariance matrix R representing power of interference from at least one other spatial layer in the set of input streams and correlation of the interference within the set of input streams of the spatial layer; performing a per-layer interference rejection combining equalization on the set of input streams, comprising:
a) estimating $x=R^{-1}h$ as a combination of a set of linear equations, wherein the number of linear equations is defined by an input parameter to be equal to or smaller than dimensions of the interference covariance matrix; and
b) computing an estimate of a transmitted symbol on the basis of the channel vector and the estimated x.

In an embodiment, the input parameter is dependent on at least one of a number of input streams in the set of input streams, a modulation and coding scheme of the spatial layer, and a total number of spatial layers configured for all terminal devices scheduled to the same time-frequency resources as the terminal device.

In an embodiment, the input parameter is dependent on the number of input streams, the modulation and coding scheme of the spatial layer, and the total number of spatial layers, and wherein values of the input parameter are directly proportional with an order of the modulation and coding scheme, directly proportional to the number of spatial layers, and inversely proportional to the number of input streams.

In an embodiment, the set of linear equations defines a Krylov sub-space presentation comprising orthonormal basis vectors defining the Krylov sub-space, wherein the input parameter defines the number of said orthonormal basis vectors.

In an embodiment, the Krylov sub-space presentation further comprises elements of a real-valued tridiagonal matrix, and wherein step b) comprises inversion of the real-valued tridiagonal matrix.

In an embodiment, the method comprises performing the inversion of the real-value tridiagonal matrix when solving weights for the orthonormal basis vectors by using Thomas algorithm, combining the weights with the respective orthonormal basis vectors and with an initial estimate, and computing the estimate of the transmitted symbol on the basis of said combining.

In an embodiment, the method comprises performing the inversion of the real-value tridiagonal matrix when solving weights for the orthonormal basis vectors by computing an eigenvalue decomposition of the tridiagonal matrix, computing the weights by inverting eigenvalues of the eigenvalue decomposition, combining the weights with the respective orthonormal basis vectors and with an initial estimate, and computing the estimate of the transmitted symbol on the basis of said combining.

In an embodiment, the method comprises using the initial estimate $x_0=h./\text{diag}(R)$ in step b), wherein ./ represents element-wise division operation.

In an embodiment, the method comprises generating the Krylov sub-space presentation by using Lanczos algorithm.

In an embodiment, the method comprises interpolating the estimated x or a parameter derived from x to time-frequency resources not carrying the reference signal.

In an embodiment, the method comprises averaging a determined number of channel estimates, wherein the determined number is a function of a modulation and coding scheme associated with the spatial layer.

In an embodiment, the determined number is smaller for a first modulation scheme than for a second modulation scheme, wherein the first modulation scheme maps a greater number of bits per symbol than the second modulation scheme.

According to an aspect, there is provided a computer program product embodied on a computer-readable medium and comprising a computer program code readable by a computer, wherein the computer program code configures the computer to carry out a computer process comprising: acquiring set of input streams associated with a spatial layer configured for a terminal device; estimating, on the basis of a reference signal, a channel vector h representing a radio channel response associated with the spatial layer; computing an interference covariance matrix R representing power of interference from at least one other spatial layer in the set of input streams and correlation of the interference within the set of input streams of the spatial layer; performing a per-layer interference rejection combining equalization on the set of input streams, comprising:
a) estimating $x=R^{-1}h$ as a combination of a set of linear equations, wherein the number of linear equations is defined by an input parameter to be equal to or smaller than dimensions of the interference covariance matrix; and
b) computing an estimate of a transmitted symbol on the basis of the channel vector and the estimated x.

LIST OF DRAWINGS

Embodiments are described below, by way of example only, with reference to the accompanying drawings, in which.

DESCRIPTION OF EMBODIMENTS

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
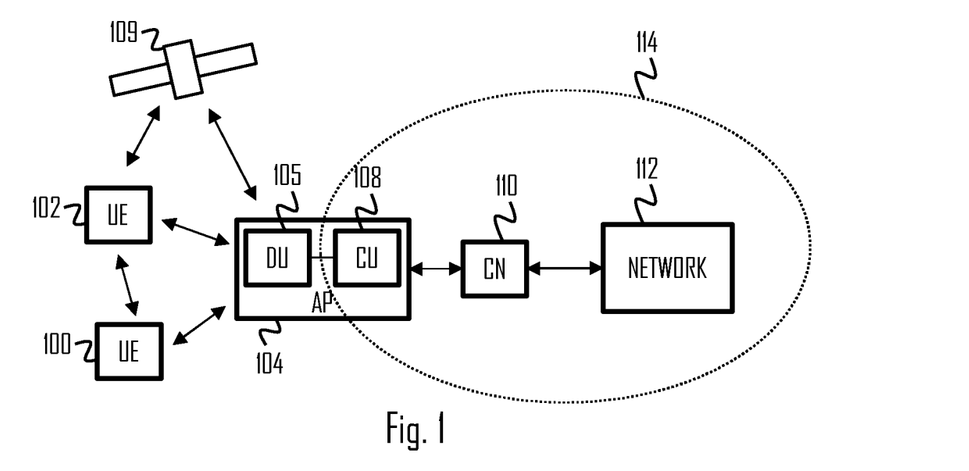
FIG. 1 illustrates a wireless communication scenario to which some embodiments of the invention may be applied.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. A person skilled in the art will realize that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows terminal devices or user devices 100 and 102 configured to be in a wireless connection on one or more communication channels in a cell with an access node (such as (e/g)NodeB) 104 providing the cell. (e/g)NodeB refers to an eNodeB or a gNodeB, as defined in 3GPP specifications. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used not only for signalling purposes but also for routing data from one (e/g)NodeB to another. The (e/g)NodeB is a computing device configured to control the radio resources of communication system it is coupled to. The NodeB may also be referred to as a base station, an access point, an access node, or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements.

The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station. 5G specifications support at least the following relay operation modes: out-of-band relay where different carriers and/or RATs (Radio access technologies) may be defined for an access link and a backhaul link; and in-band-relay where the same carrier frequency or radio resources are used for both access and backhaul links. In-band relay may be seen as a baseline relay scenario. A relay node is called an integrated access and backhaul (IAB) node. It has also inbuilt support for multiple relay hops. IAB operation assumes a so-called split architecture having CU and a number of DUs. An IAB node contains two separate functionalities: DU (Distributed Unit) part of the IAB node facilitates the gNB (access node) functionalities in a relay cell, i.e. it serves as the access link; and a mobile termination (MT) part of the IAB node that facilitates the backhaul connection. A Donor node (DU part) communicates with the MT part of the IAB node, and it has a wired connection to the CU which again has a connection to the core network. In the multihop scenario, MT part (a child IAB node) communicates with a DU part of the parent IAB node.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input—multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. SG is expected to have multiple radio interfaces, namely below or at 6 GHz, cmWave and mmWave, and also being capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz—cmWave, below or at 6 GHz—cmWave—mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and typically fully centralized in the core network. The low-latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks 112, such as a public switched telephone network or the Internet, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 105) and non-real time functions being carried out in a centralized manner (in a centralized unit, CU 108).

It should also be understood that the distribution of functions between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or node B (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway, maritime, and/or aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 109 in the mega-constellation may cover several satellite-enabled network entities that create on-ground cells. The on-ground cells may be created through an on-ground relay node or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

As described in Background, it would be beneficial to reduce computational complexity of an interference rejection combining (IRC) equalization receiver. The IRC receiver is conventionally applied to receivers with multiple antennas and multiple spatial layers configured between a transmitter and a receiver, e.g. a terminal device 100 and an access node 104. The receiver receives multiple beams or input streams from the transmitter, one stream per receiver antenna element. The multiple beams or input streams may together form one or more spatial layers configured between the transmitter and the receiver. As known in the art, the spatial layers are generated via MIMO processing and antenna arrays at both transmitter and receiver. In order to efficiently utilize beamforming and realize the spatial layers, multiple antenna elements and respective beams may be configured per spatial layers in the MIMO processing. Each spatial layer and the respective input streams of the spatial layer may be then processed at a time, by considering the signals from the other spatial layers as interference. The MIMO receiver processing may comprise reception beamforming in which a set of input streams per spatial layer are extracted from signals received by the antenna elements. The interference covariance matrix mentioned in Background is then computed to represent the power of interference in the set of streams and correlation of interference within the set of input streams of the spatial layer subjected to the IRC, and the receiver computes an IRC solution that aims to reduce the interference. The IRC solution conventionally aims to whiten the interference which involves computing an inverse of the covariance matrix. This computation is very complex, and it would be beneficial to reduce the complexity of the IRC receiver. A conventional IRC equalization solution is defined as $$\hat{s}=(H^{H}R^{-1}H+I)^{-1}H^{H}R^{-1}y \quad (1)$$

where $H \in \mathbb{C}^{N \times L}$ defines a channel matrix containing channel estimates for all antennas or input streams (and spatial layers), N defines the number of antennas or equivalently beams or input streams, L defines the number of spatial layers configured for the terminal device in the case of single-user MIMO (SU-MIMO) and in the case of multi-user MIMO (MU-MIMO) L represents the total number of spatial layers over all scheduled terminal devices, $R \in \mathbb{C}^{N \times N}$ defines the interference covariance matrix, and $y \in \mathbb{C}^{N \times 1}$ defines the received data samples. The interference covariance matrix may contain noise elements such as additive white Gaussian noise and could equally be called an interference-plus-noise covariance matrix. An output of the IRC equalization solution is a vector of transmitted symbol estimates $\hat{s}$.

In the embodiments described below, the IRC solution for the multiple spatial layers and multiple input streams is split into a single-layer IRC (SL-IRC) equalizer solution. The idea is that the IRC equalization is computed per spatial layer, allowing to reduce the dimensions and computational complexity of the IRC equalization. This reduces the representation of Equation (1) into the following form:

$$\hat{s}=(h^{H}R-1+1)^{-1}h^{H}R^{-1}y=(x^{H}h+1)^{-1}x^{H}y \quad (2)$$

where $h \in \mathbb{C}^{N \times 1}$ defines the channel vector containing estimates for all antennas or beams or input streams for a specific spatial layer, and R defines the interference (plus noise) covariance matrix for the spatial layer under study. Accordingly, the channel matrix H reduces to a channel vector h and the output of the SL-IRC solution is an estimate of the transmitted symbol $\hat{s}$ for a specific layer, instead of a symbol vector. The received sample vector y may also be spatial-layer-specific, if layer-specific beamforming has been applied. The interference covariance matrix also reduces to a matrix that represents the interference power and interference correlation between input streams of the spatial layer under the SL-IRC processing. In the conventional IRC solution, the computationally heavy part is the estimation of $R^{-1}$. This requires techniques to firstly make the covariance matrix estimate invertible and then inverting the matrix. A whitening-based IRC approach allows to avoid explicit inverse of R by using a Cholesky decomposition as a whitening matrix. Although significant savings in the processing complexity can be achieved, the approach is still too complex to allow power-efficient, low latency SL-IRC equalization in the receiver.

Figure 2:
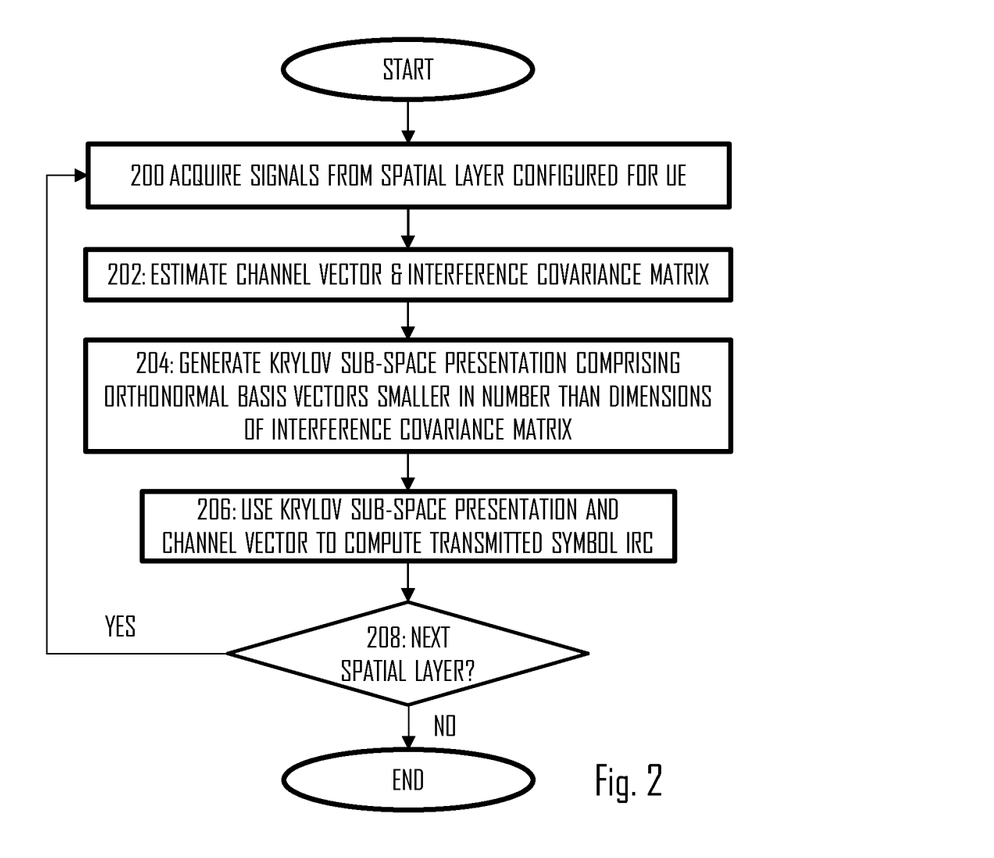
FIG. 2 illustrates a process for computing an interference rejection combining solution on a received signal according to an embodiment.

The key to note in Equation (2) is that we are interested in solving $x=R^{-1}h$ from a system of linear equations $Rx=h$. Because R is Hermitian, we also have $x^{H}=(R^{-1}h)^{H}=h^{H}R^{-H}=h^{H}R^{-1}$, and we obtain the second term for SL-IRC shown above in Equation (2). Thanks to the single-layer processing, $x^{H}h$ and $x^{H}y$ reduces to a scalar and we can use an approximation of x instead of an exact solution (see details for approximating x below). This kind of problem presentation leads us to solving $\hat{s}$ via Krylov sub-spaces that helps us in avoiding the computationally complex covariance matrix inversion. FIG. 2 illustrates an embodiment of a process for estimating an IRC equalization solution by using a set of linear equations. The process may be executed in a receiver for the terminal device 100 or for the access node, or for another radio receiver. The process may be executed by an apparatus for such a receiver, e.g. a chipset or at least one processor with at least one memory.

Referring to FIG. 2, the process comprises: acquiring (block 200) set of input streams associated with a spatial layer configured for a terminal device; estimating (block 202), on the basis of a reference signal, a channel vector representing a radio channel response associated with the spatial layer; computing (block 202) an interference covariance matrix representing power of interference from at least one other spatial layer in the set of input streams and correlation of the interference within the set of input streams of the spatial layer; performing a per-layer interference rejection combining equalization on the set of input streams, comprising: estimating $x=R^{-1}h$ as a combination of a set of linear equations, wherein the number of linear equations is defined by an input parameter to be equal to or smaller than dimensions of the interference covariance matrix; and computing an estimate of a transmitted symbol on the basis of the channel vector and the estimated x.

After block 206, it may be determined whether or not there is another spatial layer for which no IRC solution has not yet been estimated. For example, upon carrying out blocks 200 to 206 for the set of input streams of one spatial layer, the blocks 200 to 206 may be carried out for a second set of input streams of another spatial layer co-scheduled to the same time-frequency resources as the first spatial layer.

In an embodiment, the set of linear equations defines a Krylov sub-space presentation comprising orthonormal basis vectors defining the Krylov sub-space, wherein the input parameter defines the number of said orthonormal basis vectors.

Using the Krylov sub-space presentation or another presentation based on a set of linear equations in the estimation of the transmitted symbol, the inversion of the covariance matrix can be avoided. This reduces computational complexity of the IRC equalization by a substantial amount. The reduction depends on the total number of input streams per spatial layer, total number of co-scheduled spatial layers, and on the modulation and coding scheme, for example, but as much as 93 percent (%) less complex multiplications than a traditional solution based on Equation (1) and as much as 89% less complex multiplications than a solution using the whitening-based IRC can be realized. Advantages in the computational complexity can be gained with the equal dimensions of the number set of linear equations and the dimensions of the interference covariance matrix. Even further reduction in the computational complexity may be gained when the dimensions of the set of linear equations (parameter m described below for the Krylov sub-space) are smaller than dimensions of the interference covariance matrix.

Multiple radio antenna streams or beams are typically associated with each spatial layer, e.g. the first spatial layer and the second spatial layer, as known in the art. As a consequence, each spatial layer may comprise multiple input streams that define the dimensions of the interference covariance matrix R and the length of the channel vector h.

The description below focuses on the Krylov sub-space for defining the set of linear equations. However, there exist other sub-spaces or algorithms for solving the same problem, e.g., a biconjugate transpose method.

Let us now take a closer look on the use of Krylov sub-space presentation in estimating the IRC solution. The embodiments described below utilize a minimal residual method (MINRES), Lanczos algorithm, and Thomas algorithm that are as such taught by the literature. The following description provides a disclosure for adapting such commonly known algorithms to the IRC equalization. The MINRES method is a method that approximates a solution by a vector in a Krylov sub-space with low residual error. The starting point is that we want to solve x from Ax=b which in the IRC solution would be represented as Rx=h. In other words, in the following notation A=R and b=h. For this, the $m^{th}$ Krylov subspace, $K_m$, is defined as $$K_m(A, r_0) = span\{r_0, Ar_0, \ldots, A^{m-1} r_0\},$$

where $r_0 = b - Ax_0$ is the initial error given by our initial guess $x_0$. The span function follows its conventional mathematical definition. Because the vectors $r_0, Ar_0, \ldots, A^{m-1} r_0$ are linearly dependent, for example Lanczos algorithm may be used to find orthonormal basis $V_m$ for $K_m$. The algorithm described herein approximates the exact solution of $x=A^{-1}b$, with a vector $x_m \in K_m$ that provides a sufficiently small estimation error $r_m b - A(x_0 + x_m)$. One aspect of reducing the computational complexity is to select the number of basis vectors m to be sufficiently small while achieving sufficiently low estimation error $r_m = b - A(x_0 + x_m)$. One aspect of defining the sufficiently low estimation error is that bit or block error rate performance of a radio link between the transmitter and the receiver is not compromised. Another aspect is that we can trade-off link performance and power consumption, e.g., in UE receiver we can use smaller m-value to reduce power consumption in low-battery scenario. We can rewrite the vector $x = x_0 + x_m = x_0 + V_m z$, where $x_0$ is an initial guess, $x_m$ is the approximate in $K_m(A, r_0)$ and $z \in \mathbb{R}^m$ is a vector containing the linear combination weights for the orthonormal basis vectors.

The initial guess may be set to zero, $x_0 = 0$ but, in another embodiment, $x_0 = h./\text{diag}(R)$, which defines that each element of the channel vector h is divided with the corresponding diagonal element of R. It has been discovered that this initialization may provide improved performance particularly in the case of SL-IRC. As described above, the number of orthonormal basis vectors m defining the Krylov subspace presentation is a parameter affecting the computation complexity. As described above in connection with FIG. 2, the value of m is selected to define dimensions of the Krylov sub-space to be smaller than dimensions of the interference covariance matrix R. In practice, it means that $m < N_r$, where $N_r$ is the number of input streams in the spatial layer subjected to the SL-IRC estimation Embodiments for selecting m are described below. The same principles apply to the other equivalent methods for solving x from Rx=h, e.g., the biconjugate transpose method.

The Krylov presentation or, equivalently, an orthonormal Krylov subspace may be created by using the Lanczos algorithm described in greater detail in the literature. As an output, a matrix, $V_m$, containing the m orthonormal basis vectors of the Krylov subspace are acquired. Furthermore, the Lanczos algorithm outputs real valued vectors α and β, that correspond to elements of the main diagonal (α) and first sub-diagonals (β) of the symmetric tri-diagonal matrix $H_m$, respectively. The first sub-diagonals of $H_m$, are identical, as known in connection with Lanczos algorithm. The Lanczos algorithm belongs to a family of power methods for finding the eigenvalues and the orthonormal eigenvectors, and other embodiments may employ another power method. An Arnoldi iteration method is yet another potential algorithm.

Following the MINRES method, the next task is to solve $X_m = V_m z$, but first we have to solve $$\min_z \|H_m z - \gamma e_1\|_2,$$

where $\gamma = \text{norm}(r_0)$ is the vector norm of $r_0$, and $e_1 = [1, 0, \ldots, 0]$ is the identity vector.

By noting the tri-diagonal structure of $H_m$, the Thomas algorithm can be used to directly solve $z = H_m^{-1} \gamma e_1$. At this point, an approximation is made that $\|H_m z - \gamma e_1\|_2 = 0$. $H_m$ may be arranged to have only real values without impacting the link performance. This results from the use of the Lanczos algorithm. With finite precision arithmetics, complex values may appear but such values may be forced to be represented by using only the real values. This allows to implement the Thomas algorithm only for real values, thus reducing the computational complexity.

Then, $X_m = V_m z$ and the estimate $x = x_m + x_0 \approx R^{-1} h$ are computed. After this, solving the IRC solution is straightforward by following Equation (2). With the knowledge of x, the received signal y, and the channel vector h, the estimate of the transmitted symbols is computed and output for further processing in the receiver. The further processing may include demodulation and decoding, for example.

Figure 3:
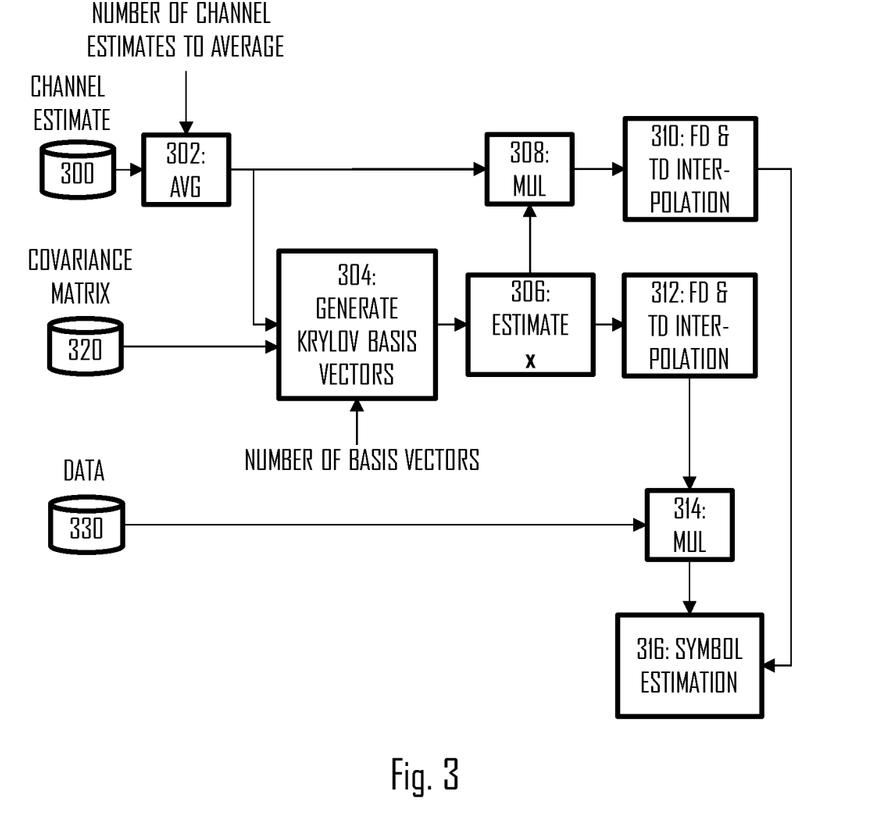
FIG. 3 illustrates a receiver architecture comprising some embodiments.

FIG. 3 illustrates a processing chain or, equivalently, an architecture of a receiver for computing the SL-IRC solution described above. Referring to FIG. 3, the channel vector h may be stored in a buffer 300, the covariance matrix R may be stored in a buffer 320, and a received data symbol vector y may be stored in a buffer 330. The channel vector may be subjected to an averaging operation in block 302, and the number of channel estimates to be averaged may be adaptive and a function of determined parameters, e.g. a modulation and coding scheme (MCS) applied to the data symbols. In other embodiments, the averaging is omitted.

The Krylov sub-space basis vectors are generated in block 304, and the number of basis vectors is defined by the input parameter m. As described above, m may be smaller than the dimensions of the covariance matrix, e.g. the number of columns of the covariance matrix R. In an embodiment, m is dependent on at least one of a number of input streams $N_r$ in the set if input streams of the spatial layer under IRC processing, the MCS of the spatial layer subjected to the interference rejection combining equalization, and a total number of spatial layers configured for the terminal device and, optionally, other terminal devices in the same time-frequency resources. An access node may schedule the same time-frequency resources but different spatial layers to multiple terminal devices. In an embodiment of FIG. 2 or 3, m is a function of a plurality of these parameters, or even all of them as described below.

In an embodiment, m is dependent on the number of input streams in the set of input streams, the modulation and coding scheme of the spatial layer subjected to the interference rejection combining equalization, and the number of spatial layers configured for the terminal device(s), and wherein values of the input parameter are directly proportional with an order of the modulation and coding scheme, directly proportional to the number of spatial layers, and inversely proportional to the number of input streams. The number of spatial layers may include all spatial layers associated with the same time-frequency resource, e.g. they may include spatial layers configured to the terminal device but they may also include one or more spatial layers scheduled to one or more other terminal devices. The logic is that with a smaller number of spatial layers, there is less interference and thus a smaller Krylov sub-space can provide sufficient performance. The same principle applies to the other sub-spaces or other sets of linear equations, e.g. the biconjugate transpose method. Tables below illustrate some embodiments of dependence of m on each of these parameters.

| Number of Spatial Layers $N_L$ | Value of m |
| --- | --- |
| 1 | 1 |
| 2 | 2 |
| 3 | 3 |
| 4 | 4 |
| 5 | 5 |
| 6 | 5 |
| 7 | 6 |
| 8 | 6 |

| Number of Input Streams $N_B$ | Change to Value of m |
| --- | --- |
| 8 | +1 |
| 16 | 0 |
| 24 | −1 |

| Modulation and Coding Scheme | Change to Value of m |
| --- | --- |
| QPSK | −3 |
| 16-QAM | −1 |
| 64-QAM | 0 |
| 256-QAM | +1 |

With respect to the modulation and coding schemes, QPSK means quadrature phase shift keying and QAM quadrature amplitude modulation. The number before QAM means the number of symbols in the symbol constellation, as known in the art. In a case where the number of spatial layers and at least one of the number of input streams and the modulation and coding scheme is used for selecting the value of m, the number of spatial layers may be used to define an initial value for m that may then be adapted on the basis of the modulation and coding scheme and/or the number of input streams by using the above-described logic. With lower number of input streams, the initial value may be increased while it may be decreased with the greater number of input streams. With lower-order modulation and coding schemes such as the QPSK or 16-QAM, the initial value may be decreased, while it may be maintained or even increased with the high-order modulation schemes such as 64-QAM and 256-QAM. Since the number of spatial layers is common to all spatial layers subjected to the IRC processing, that number may be equal to all spatial layers. However, variation in the value of m for the different spatial layers may be introduced, if the spatial layers are configured with a different number of input streams $N_r$ and different modulation and coding schemes.

The dependence of m on the MCS may be expanded to dependence of m on a code rate of the spatial layer. The same logic as with the MCS may apply, meaning that a smaller m may be selected if the code rate is small (below a threshold) while a greater m may be selected for a greater code rate (above the threshold). Multiple thresholds may be used in a case where m may assume more than two values, but the logic remains: the value of m is proportional to the value of the code rate.

As described above, the Krylov sub-space presentation output from block 304 comprises elements of a real-valued tridiagonal matrix α and β, and wherein step b) comprises inversion of the real-valued tridiagonal matrix $H_m$.

$$H_m = \begin{pmatrix} \alpha_1 & \beta_2 & \ldots & 0 & 0 \\ \beta_2 & \alpha_2 & \beta_3 & \ddots & 0 \\ \vdots & \beta_3 & \alpha_3 & \ddots & \vdots \\ 0 & \vdots & \ddots & \ddots & \beta_m \\ 0 & 0 & \ldots & \beta_m & \alpha_m \end{pmatrix}$$

In order to solve z (the weights for the orthonormal basis vectors), as described above, the matrix $H_m$ needs to be inverted. Thanks to being real-valued and having reduced dimensions, it is much less complex than inverting the complex-valued interference covariance matrix. In an embodiment the inversion of the real-value tridiagonal matrix is carried out when solving weights for the orthonormal basis vectors by using the Thomas algorithm. Alternative solution is to use, e.g., an eigen value decomposition on matrix $H_m$, and build estimate on z by using a specific number of eigen vectors and inverted eigen values to represent inverse of $H_m$. As known in the art, the Thomas algorithm solves z from $H_m z = d$ where $d = \gamma e_1$, as described above. In the case of m=1, z is solved as $$z = \frac{\gamma}{\alpha_1}.$$

After solving the weights for the orthonormal basis vectors defining the Krylov sub-space presentation, we can solve x, as described above (block 306). Following Equation (2) and FIG. 3, Hermitian transpose of x is then multiplied with the channel vector in block 308. The result, $x^H h$ can be assumed to be real-valued to reduce memory consumption and to reduce computational complexity in the following interpolation steps. Then, both x and $x^H h$ are subjected to time-domain and frequency-domain interpolation in blocks 310 and 312, respectively. The purpose of the interpolation is to estimate values of x (or equivalently $x^H$) and $x^H h$ for all sub-carriers and all time-domain signals (or samples) carrying a data symbol y. As known in the art, demodulation reference symbols (DMRS) are transmitted only on certain (not all) sub-carriers and/time-domain symbols. Therefore, the estimates of x apply only to those sub-carriers and time-domain symbols and may be interpolated to the other sub-carriers and time-domain symbols in blocks 310 and 312. One advantage of this architecture is, in addition to those described above, that the Lanczos algorithm, (tridiagonal) matrix inversion, and computation of $x^H h$ is performed before the interpolation blocks. As a consequence, the number of sub-space processing calls and following samples subjected to the inversion, and number of vector products required to solve $x^H h$, is much smaller than in a case where the inversion was performed after the interpolation. As a consequence, low computational complexity can be achieved.

Following again Equation (2), the Hermitian transpose of estimate of x is then multiplied with the received signal sample y in block 314. Thereafter, the remaining operations of Equation (2) are performed in block 316, thus acquiring the IRC estimate of the transmitted symbol.

Figure 4:
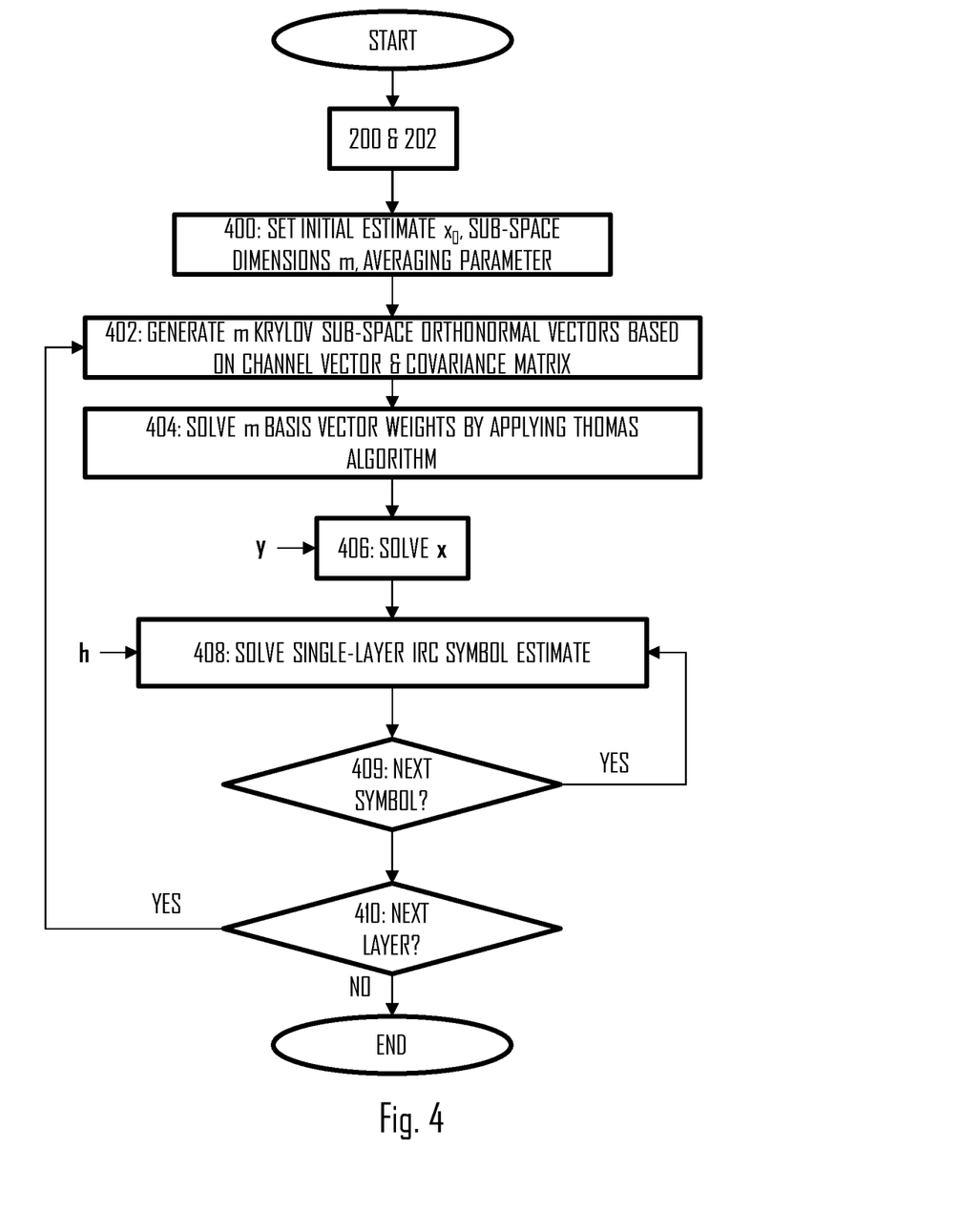
FIG. 4 illustrates a detailed procedure of a process for computing an interference rejection combining solution by using a Krylov sub-space presentation.

FIG. 4 illustrates a detailed flow diagram of the procedure and let us disclose some further embodiments with reference to FIG. 4. After blocks 200 and 202, or in parallel with them, at least some parameters of the algorithm are initialized in block 400. The parameter initialized in block 400 may include at least one of the following parameters: the dimensions of the Krylov sub-space m, the initial estimate xo, and the averaging parameter input to block 302.

As described, above, the initial estimate xo may be initialized as zero or as $x_0$=h./diag(R) where ./ represents element-wise division operation.

In an embodiment, the averaging parameter is a function of the modulation and coding scheme, similarly to m. The dependence of the averaging parameter on the modulation and coding scheme may follow a logic where parameter value is smaller for a first modulation scheme than for a second modulation scheme, wherein the first modulation scheme maps a greater number of bits per symbol than the second modulation scheme. In other words, the averaging parameter is smaller for a higher-order modulation scheme such as 64-QAM or 256-QAM than for a lower-order modulation scheme such as QPSK or 16-QAM. Table below illustrates an embodiment of the dependence. The same principle applies to the other sub-spaces or other sets of linear equations, e.g. the biconjugate transpose method.

| Modulation and Coding Scheme | Averaging Parameter Value |
| --- | --- |
| QPSK | $N_{channelEstimatePerPRB}$ |
| 16-QAM | $N_{channelEstimatePerPRB}/2$ |
| 64-QAM | $N_{channelEstimatePerPRB}/2$ |
| 256-QAM | 1 |

By including the layer-specific code rate information to the MCS table, even more accurate control on the value of averaging parameter can be achieved. For example, if the code rate with 64-QAM is larger than 0.8, the averaging parameter value is set to $N_{channelEstimatePerPRB}/3$.

The averaging may be performed per physical resource block (PRB) with $N_{channelEstimatePerPRB}$ channel estimates, i.e. the averaging may be performed over channel estimates in the frequency domain within the PRB. As known in the art, the PRB may comprise a determined number of frequency resource elements (e.g. sub-carriers). As illustrated in the Table, when the modulation and coding scheme is of low order such as the QPSK, $N_{channelEstimatePerPRB}$ channel estimates may be averaged. In an embodiment, that all channel estimates of the PRB are averaged in the case of QPSK. With medium-order modulation and coding schemes such as 16-QAM and 64-QAM, $N_{channelEstimatePerPRB}/2$ channel estimates may be averaged, and the averaging may be omitted for a high-order modulation and coding scheme such as 256-QAM. Accordingly, the computational complexity can be reduced while maintaining acceptable performance. As described above and illustrated in FIG. 3, the averaging may be performed before computing x.

The parameters to be initialized may depend on the embodiment, e.g. whether or not to perform the above-described averaging of channel estimates. In embodiments that do not support the averaging of channel estimates, the respective initialization of the averaging parameter may naturally be omitted. Similarly, if the initial estimate is fixed, e.g. $x_0$=0, the initialization may be void of computations and simplify into a memory retrieval.

In block 402, the Krylov sub-space orthonormal basis vectors are generated for a spatial layer under processing (see also block 304), e.g., by using the Lanczos method or another power method, based on the channel vector and interference covariance matrix. Then, the weights for the basis vectors may be computed by using the Thomas algorithm, for example. Thereafter, x may be solved in block 406 (see also block 306), and block 406 may comprise combining the orthonormal basis vectors with respective weights. Then, the final SL-IRC estimate may be computed in block 408 where the weights are combined with the respective orthonormal basis vectors and with an initial estimate. Block 408 may be repeated (via block 409) to other symbols of the spatial layer. As described above, the interpolation spans the estimate of x or a parameter derived from x (e.g. $x^H h$) to the other time-frequency resource (sub-carriers and/or time-domain symbols). As a consequence, IRC estimates of the values of data symbols transmitted on the respective time-frequency resources of the same spatial layer may be computed by repeating block 408. In block 410, it is determined whether or not there is a spatial layer still to be processed. If there is, the process returns to block 402 where the next spatial layer and the respective input streams are taken into the processing. If all the spatial layers have been processed, the process may end.

It should be appreciated that the sequential order of processing symbols within a spatial layer and processing spatial layers (arrangement of blocks 409 and 410) may be various. The different spatial layers may be processed even in parallel by different processing circuitries, for example.

Figure 5:
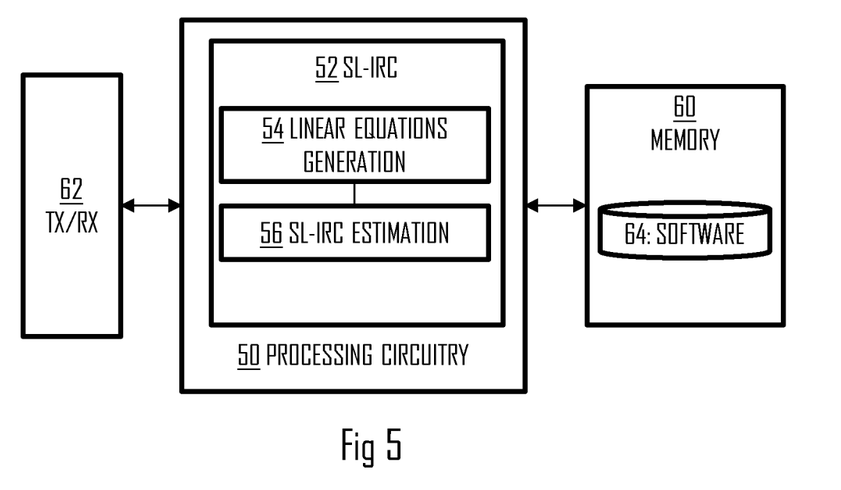
FIG. 5 illustrates a block diagram of a structure of an apparatus according to an embodiment.

FIG. 5 illustrates an apparatus according comprising a processing circuitry 50, such as at least one processor, and at least one memory 60 including a computer program code (software) 64, wherein the at least one memory and the computer program code (software) are configured, with the at least one processor, to cause the apparatus to carry out the process of FIG. 2 or any one of its embodiments described above. The apparatus may be for the terminal device 100 or for the access node 104, e.g. for the DU or CU. The apparatus may be a circuitry or an electronic device realizing some embodiments of the invention in the terminal device or the access node. The apparatus carrying out the above-described functionalities may thus be comprised in such a device, e.g. the apparatus may comprise a circuitry such as a chip, a chipset, a processor, a micro controller, or a combination of such circuitries for the terminal device or the access node. In other embodiments, the apparatus is generally for a radio device, e.g. the radio device or a circuitry in or designed to operate in the radio device.

The memory 60 may be implemented using any suitable data storage technology, such as semiconductor-based memory devices, flash memory, magnetic memory devices and systems, optical memory devices and systems, fixed memory and removable memory.

The processing circuitry 50 may comprise a SL-IRC processing circuitry 52 configured to carry out the IRC estimation on the received input streams according to any one of the above-described embodiments. The SL-IRC processing circuitry 52 may comprise a linear equations generation circuitry 54 configured to generate the basis vectors and respective weights for the basis vectors or the sets of linear equations to approximate x. The SL-IRC processing circuitry may further comprise a SL-IRC solution estimation circuitry configured to compute the SL-IRC solution by using the sub-space presentation or the sets of linear equations received from the circuitry 54. The SL-IRC circuitry may further comprise at least some further components or functions from the architecture illustrated in FIG. 3 and described in the embodiments above.

In an embodiment, the apparatus further comprises a radio transceiver 62 with multiple antenna elements for receiving the input streams for the IRC processing. The radio transceiver 62 may further comprise other conventional radio receiver components such as filters, amplifiers, frequency-converters and base band signal processing components and functions.

As used in this application, the term 'circuitry' refers to one or more of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to uses of this term in this application. As a further example, as used in this application, the term "circuitry"would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention. The processes or methods described in FIG. 3 or any of the embodiments thereof may also be carried out in the form of one or more computer processes defined by one or more computer programs. The computer program(s) may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

The processes or methods described in FIGS. 2 to 4, or any of the embodiments thereof may also be carried out in the form of one or more computer processes defined by one or more computer programs. The computer program(s) may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units. References to computer-readable program code, computer program, computer instructions, computer code etc. should be understood to express software for a programmable processor such as programmable content stored in a hardware device as instructions for a processor, or as configured or configurable settings for a fixed function device, gate array, or a programmable logic device.

Embodiments described herein are applicable to wireless networks defined above but also to other wireless networks. The protocols used, the specifications of the wireless networks and their network elements develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. Embodiments are not limited to the examples described above but may vary within the scope of the claims.

The invention claimed is:
1. An apparatus comprising:
at least one processor; and
at least one memory including computer program code that, when
executed by the at least one processor, cause the apparatus to perform:
acquiring set of input streams associated with a spatial layer configured for a terminal device;
estimating, on the basis of a reference signal, a channel vector h representing a radio channel response associated with the spatial layer;
computing an interference covariance matrix R representing power of interference from at least one other spatial layer in the set of input streams and correlation of the interference within the set of input streams of the spatial layer;
performing a per-layer interference rejection combining equalization on the set of input streams, comprising:
a) estimating $x=R^{-1}h$ as a combination of a set of linear equations, wherein the number of linear equations is defined by an input parameter to be equal to or smaller than dimensions of the interference covariance matrix; and
b) computing an estimate of a transmitted symbol on the basis of the channel vector and the estimated x.

2. The apparatus of claim 1, wherein the input parameter is dependent on at least one of a number of input streams in the set of input streams, a modulation and coding scheme of the spatial layer, and a total number of spatial layers configured for all terminal devices scheduled to the same time-frequency resources as the terminal device.

3. The apparatus of claim 2, wherein the input parameter is dependent on the number of input streams, the modulation and coding scheme of the spatial layer, and the total number of spatial layers, and wherein values of the input parameter are directly proportional with an order of the modulation and coding scheme, directly proportional to the number of spatial layers, and inversely proportional to the number of input streams.

4. The apparatus of claim 1, wherein the set of linear equations defines a Krylov sub-space presentation comprising orthonormal basis vectors defining the Krylov sub-space, wherein the input parameter defines the number of said orthonormal basis vectors.

5. The apparatus of claim 4, wherein the Krylov sub-space presentation further comprises elements of a real-valued tridiagonal matrix, and wherein step b) comprises inversion of the real-valued tridiagonal matrix.

6. The apparatus of claim 5, wherein the at least one memory and computer program code are further configured, with the at least one processor, to cause the apparatus to perform the inversion of the real-value tridiagonal matrix when solving weights for the orthonormal basis vectors by using Thomas algorithm, to combine the weights with the respective orthonormal basis vectors and with an initial estimate, and to compute the estimate of the transmitted symbol on the basis of said combining.

7. The apparatus of claim 5, wherein the at least one memory and computer program code are further configured, with the at least one processor, to cause the apparatus to perform the inversion of the real-value tridiagonal matrix when solving weights for the orthonormal basis vectors by computing an eigenvalue decomposition of the tridiagonal matrix, to compute the weights by inverting eigenvalues of the eigenvalue decomposition, to combine the weights with the respective orthonormal basis vectors and with an initial estimate, and to compute the estimate of the transmitted symbol on the basis of said combining.

8. The apparatus of claim 6, wherein the at least one memory and computer program code are further configured, with the at least one processor, to cause the apparatus to use the initial estimate $x_0=h./\text{diag}(R)$ in step b), wherein ./ represents element-wise division operation.

9. The apparatus of claim 4, wherein the at least one memory and computer program code are further configured, with the at least one processor, to cause the apparatus to generate the Krylov sub-space presentation by using Lanczos algorithm.

10. The apparatus of claim 1, where the at least one memory and computer program code are further configured, with the at least one processor, to cause the apparatus to interpolate the estimated x or a parameter derived from x to time-frequency resources not carrying the reference signal.

11. The apparatus of claim 1, wherein the at least one memory and computer program code are further configured, with the at least one processor, to cause the apparatus to average a determined number of channel estimates, wherein the determined number is a function of a modulation and coding scheme associated with the spatial layer.

12. The apparatus of claim 11, wherein the determined number is smaller for a first modulation scheme than for a second modulation scheme, wherein the first modulation scheme maps a greater number of bits per symbol than the second modulation scheme.

13. A computer-implemented method for a radio receiver, comprising:
  acquiring set of input streams associated with a spatial layer configured for a terminal device;
  estimating, on the basis of a reference signal, a channel vector h representing a radio channel response associated with the spatial layer;
  computing an interference covariance matrix R representing power of interference from at least one other spatial layer in the set of input streams and correlation of the interference within the set of input streams of the spatial layer;
  performing a per-layer interference rejection combining equalization on the set of input streams, comprising:
    a) estimating $x=R^{-1}h$ as a combination of a set of linear equations, wherein the number of linear equations is defined by an input parameter to be equal to or smaller than dimensions of the interference covariance matrix; and
    b) computing an estimate of a transmitted symbol on the basis of the channel vector and the estimated x.

14. A computer program product embodied on a non-transitory computer-readable medium and comprising a computer program code readable by a computer, wherein the computer program code configures the computer to carry out a computer process comprising:
  acquiring set of input streams associated with a spatial layer configured for a terminal device;
  estimating, on the basis of a reference signal, a channel vector h representing a radio channel response associated with the spatial layer;
  computing an interference covariance matrix R representing power of interference from at least one other spatial layer in the set of input streams and correlation of the interference within the set of input streams of the spatial layer;
  performing a per-layer interference rejection combining equalization on the set of input streams, comprising:
    a) estimating $x=R^{-1}h$ as a combination of a set of linear equations, wherein the number of linear equations is defined by an input parameter to be equal to or smaller than dimensions of the interference covariance matrix; and
    b) computing an estimate of a transmitted symbol on the basis of the channel vector and the estimated x.

* * * * *